April 26, 1932.  F. TURZICKY  1,855,209
TRACTOR
Filed Feb. 20, 1931  6 Sheets-Sheet 1

April 26, 1932.  F. TURZICKY  1,855,209

TRACTOR

Filed Feb. 20, 1931   6 Sheets-Sheet 2

Inventor:
Francis Turzicky
By John E. Titus
Atty.

April 26, 1932.  F. TURZICKY  1,855,209
TRACTOR
Filed Feb. 20, 1931  6 Sheets-Sheet 3

April 26, 1932. F. TURZICKY 1,855,209
TRACTOR
Filed Feb. 20, 1931 6 Sheets-Sheet 5

Patented Apr. 26, 1932

1,855,209

UNITED STATES PATENT OFFICE

FRANCIS TURZICKY, OF CHICAGO, ILLINOIS, ASSIGNOR TO HENRY E. BULLOCK, OF CHICAGO, ILLINOIS

TRACTOR

Application filed February 20, 1931. Serial No. 517,276.

This invention relates to improvements in tractors, more especially of the chain tread type, wherein the steering is accomplished by driving the tread chains independently.

In this invention a variable speed transmission, such as is universally employed in automotive vehicles, is used, so that the controls and ordinary driving is the same as for an automobile; and the transmission is directly geared to a transversely disposed power shaft which runs at relatively high speeds as compared with the wheels which drive the treads, a separate chain of reducing gears being provided for each tread chain. The clutches, which may be of the dry disc type, are then mounted on the high speed power shaft, at either side of the tractor, so that the advantage of clutching at high speed and low torque are obtained, enabling the use of light clutch mechanism which has been thoroughly standardized. This also results in ease of operation of the clutches and smoothness in engagement.

By mounting on the power shaft at each side of the tractor, the clutch mechanism is rendered readily accessible for adjustment or repairs without disturbing any of the rest of the mechanism of the tractor. Also the disengagement of one of the clutches diverts all of the power to the other clutch for turning the tractor in the direction of the released tread.

In order to accomplish a quick turn, a brake is provided for the fly wheel of each clutch, and means controlled by the steering wheel for releasing the clutch at either side and then applying the brake in conjunction therewith. At each side the brake is connected by a fork to a sleeve which engages with the clutch release, and the steering wheel is connected to move either sleeve without disturbing the other; and when the steering wheel is released the clutch springs move the sleeves back to normal position and the wheel back to central position for going straight.

Also the power take-off pulley is mounted directly on the power shaft, and no special shaft, gearing or clutches are required for the power pulley, which also may be operated at the different speeds of the selective transmission, if so desired. The tractor can also be instantly placed in condition for delivering power by applying the brakes and locking down the brake pedal.

Other objects and advantages will become apparent in the following description with reference to the accompanying drawings, in which an illustrative embodiment of this invention is shown.

Fig. 5ª is a detail view of parts taken on the line 5ª—5ª of Fig. 5.

The tractor comprises an engine 10, having a fly-wheel housing 11, to which the front end of a gear case 12 is bolted. The gear case is substantially rectangular in its transverse sections, and deeper at the rear than at the front, the front end being provided with a circular flange 13 for bolting to the flywheel bell housing 11.

In the front portion of the gear case are two spaced transverse partition walls 14 and 15 in which are journaled the jointed propeller shaft 16 and 161 and the transmission lay shaft 17, said shafts being provided with the reverse gears 19 and 20, the first speed gears 21 and 22, the second speed gears 23 and 24, and the constant mesh gears 25 and 26, the gears 20, 22, 24 and 26 being fixed on the lay shaft. The gears 19, 21 and 23 are rotatably mounted on the propeller-shaft joint 161 and connected thereto, respectively, by the clutches 27 and 28 formed integrally, and the clutch 29, said clutches being slidably mounted on the shaft joint 161. The gear 25 is formed on the hub 30 of the shaft joint 16; the front end of the joint 161 is rotatably supported in the hub 30; and on the face of the hub are formed the clutch teeth 31 with which the direct-drive clutch 32, formed integrally with the shaft 29, engages. Said clutch elements are shifted by means of the clutch lever 33, pivotally mounted in the cover 34 of the change-speed gear space between the walls 14 and 15, the lever 33 being engageable with the shifter forks 34 and 35 to which the clutch elements 28 and 29 are rotatably connected. Thus the propeller-shaft joint 161 may be driven at three speeds forward and one speed in reverse, as in an automobile, obtaining relatively low speeds and also the full speed of the engine. The propeller-shaft portion 16 is connectible to the engine fly-wheel 36 through a well known form of clutch 37 controlled by the clutch pedal 38, said pedal being fixed on the clutch operating shaft 29, which is rotatably mounted in the walls of the housing 12.

On the rear end of the propeller shaft 161, which projects through the wall 15, is keyed a bevel pinion 40, from which the chain-belt treads 41 and 42 are selectively driven, as will be described hereinafter.

Said tractor chain belts are movably mounted on the right-side and left-side truck frames 43 and 44, which frames are similarly constructed and comprise the spaced longitudinal angle truck-frame members 45 and 46 (see Fig. 2), between which are rotatably mounted the wheels 47, which ride on the lower portion of the treads. Between the front ends of each pair of said members are rotatably mounted the sprocket wheels 48, which support the chains at the front.

At the rear of the tractor is provided a dead axle 49, on which are rotatably mounted the sleeves 50 and 51, to which are secured the tread driving sprockets 52 and 53, respectively. Said sprockets are positioned between the rear ends of the frame members and support and engage with the rear portions of the respective tread chains. At the inner sides of the sprockets, the sleeves are enclosed in the bearings 54, bolted in the frame member 46; and at the outer sides the ends of the axle 49 are journaled in the pedestal bearings 55, bolted to the outer frame members 45.

Figure 1:
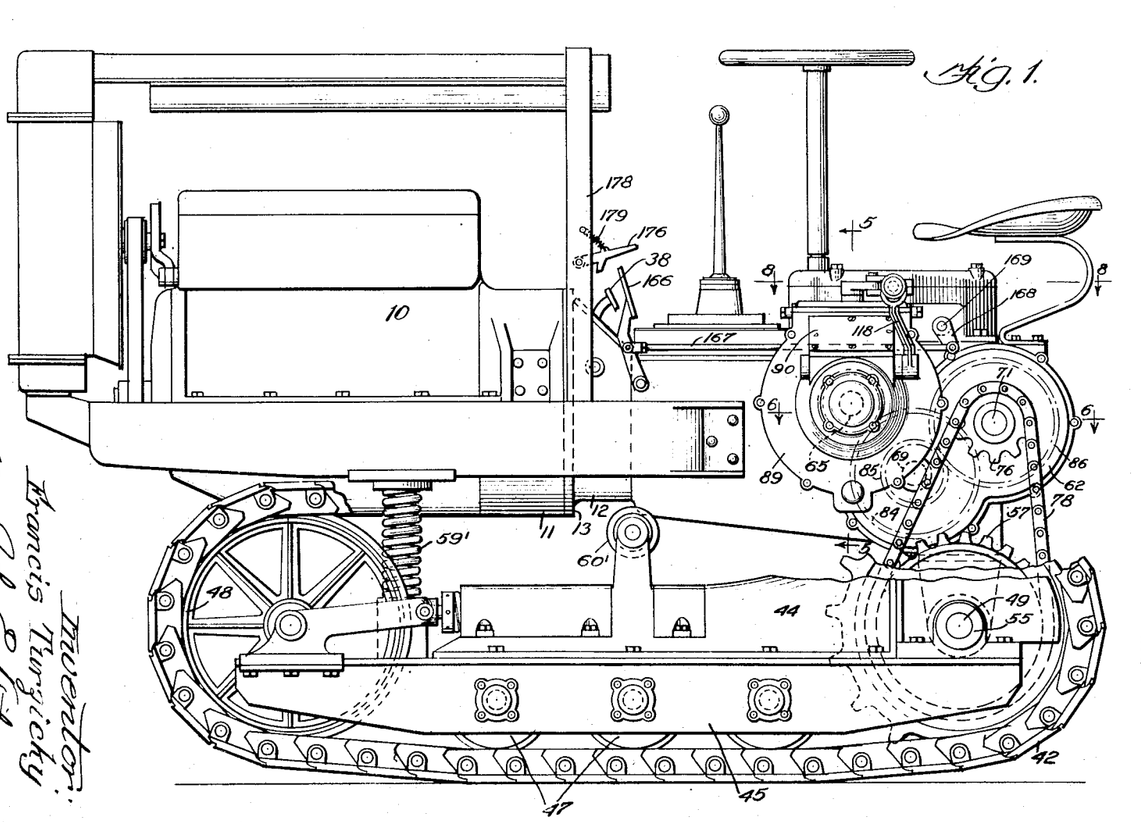
Fig. 1 is a side elevation of the tractor.
Figure 2:
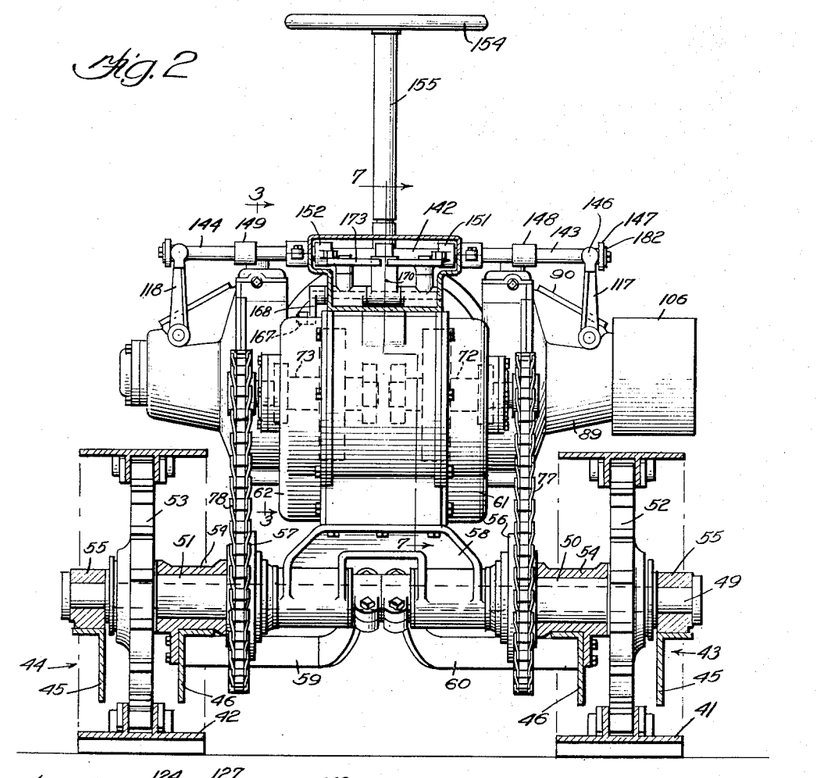
Fig. 2 is a view looking from the rear, with portions broken away and portions shown in section.

On the inner ends of the hubs 50 and 51 are secured the drive-chain sprockets 56 and 57, respectively; and on the axle 49, between the sprockets, is rotatably mounted a bifurcated bearing 58, which supports and is bolted to the rear end of the gear case 12. The front ends of the truck frames are connected by the braces 59 and 60 to the axle 49, the rear ends of the braces being rotatably connected to the portion of the axle in the notch of the member 58, as best shown in Fig. 2. At the front end the engine is supported by springs 59' which are mounted on the truck frames; and the upper flights of the tread chains are supported by rollers 60' mounted in the mid portions of the trucks.

Figure 6:
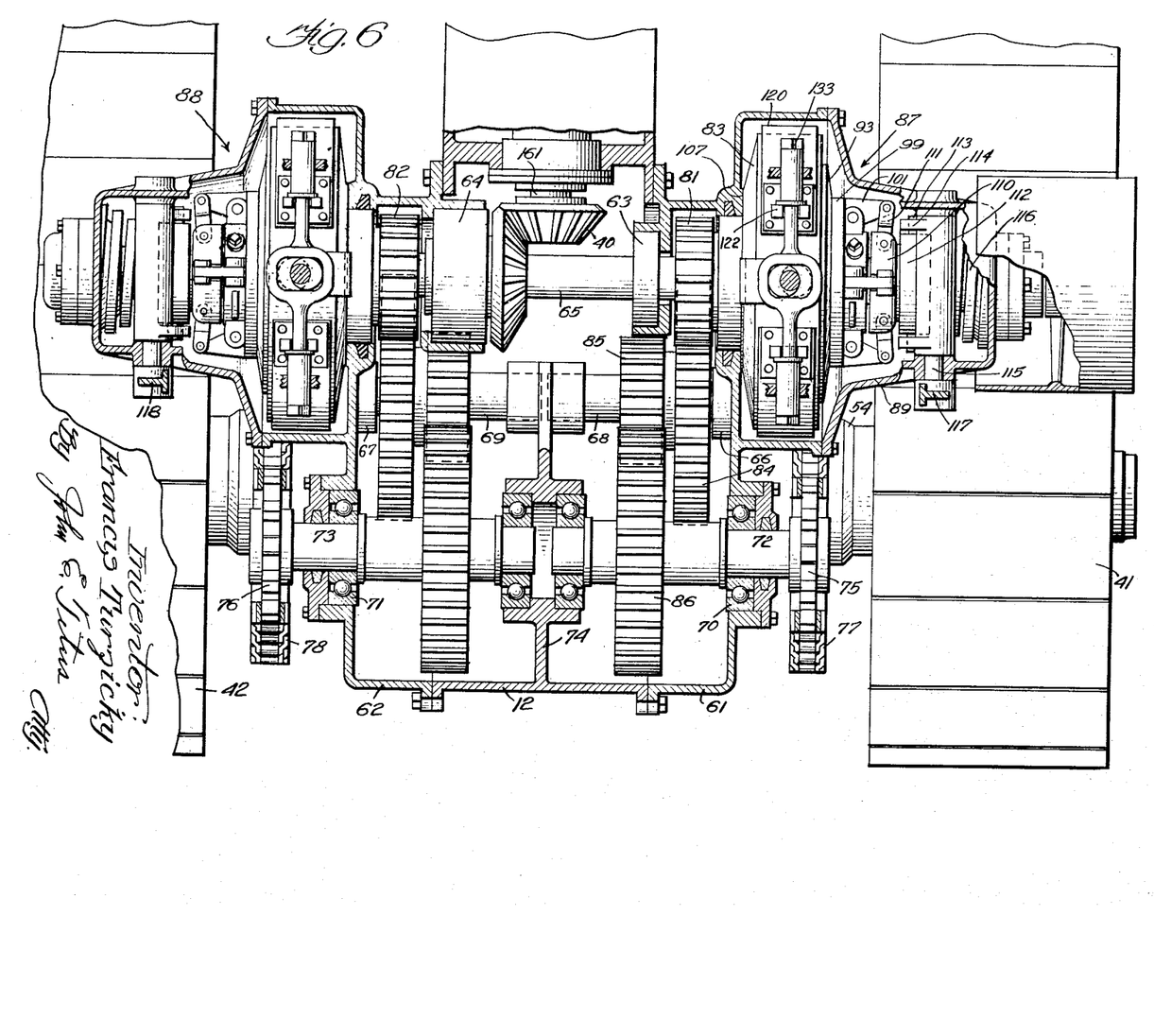
Fig. 6 is a plan section through the transmission housing on the line 6—6 of Fig. 1, with parts shown in full and parts shown in section.

The rear portion of the housing 12 is apertured at the sides, and over the apertures are bolted the right-hand gear casing 61 and the left-hand casing 62. Said casings support the bearings 63 and 64, respectively, in which the high-speed clutch or power shaft 65 is rotatably mounted; and likewise the bearings 66 and 67 of the intermediate shafts 68 and 69; and the bearings 70 and 71 for the drive shafts 72 and 73, the inner ends of said shafts 68 and 69, and 72 and 73, being journaled in a central partition wall 74 formed in the case 12, as best shown in Fig. 6.

To the shafts 72 and 73 are secured, respectively, the sprocket pinions 75 and 76, which are connected by the chains 77 and 78 to the correlated sprocket wheels 56 and 57, as best shown in Fig. 2.

Figures 5, 5A:
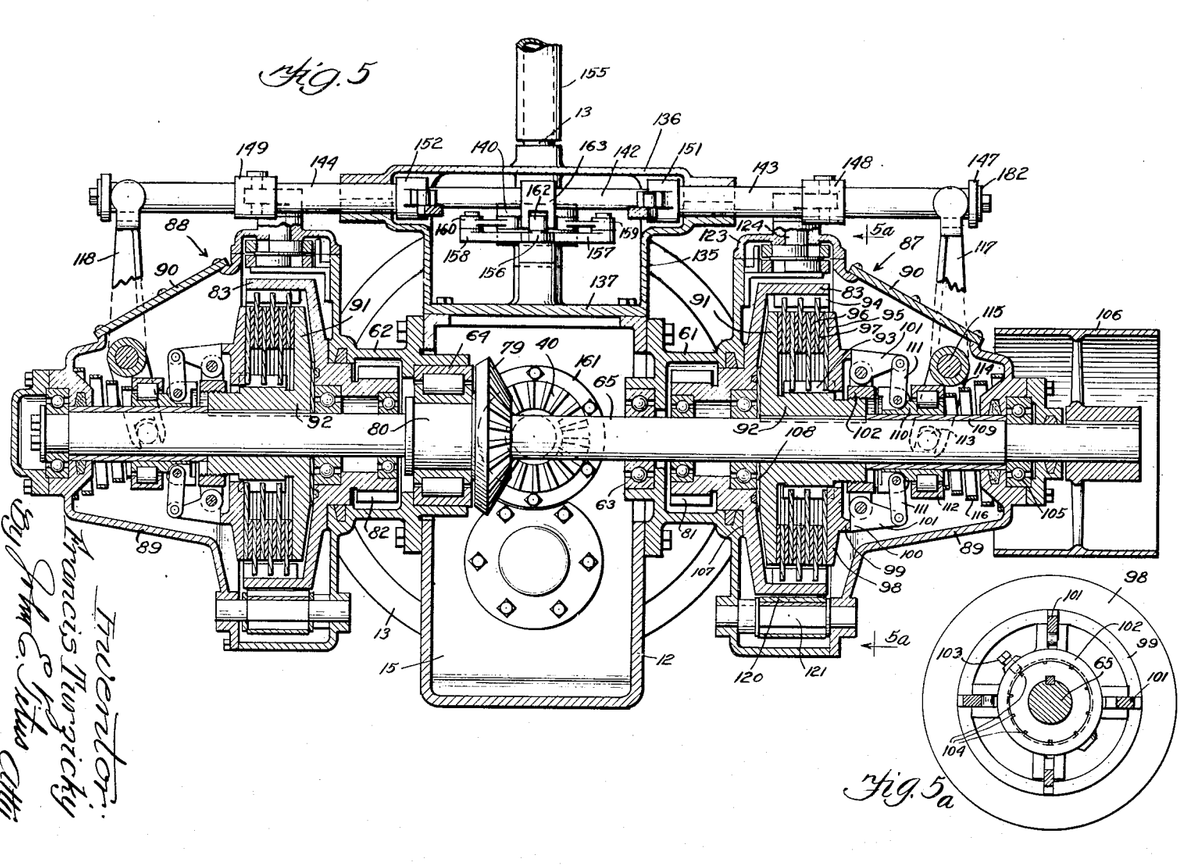
Fig. 5 is a transverse vertical section on line 5—5 of Fig. 1.

On the clutch shaft 65 is keyed a bevel gear 79 which meshes with the bevel pinion 40, the hub 80 of the gear 79 being extended through the bearing 64, as best shown in Fig. 5, and rotatably mounted on the shaft 65 outside of the bearings 63 and 64, are rotatably mounted the pinions 81 and 82, respectively, at the right and left sides. On each of said pinions 81 and 82 is formed the bell-shaped clutch housing or fly wheel 83, each facing outwardly as shown.

The clutch-shaft pinions 81 and 82 are positively geared to their corresponding chain pinion shafts 72 and 73 through a compounded reduction gearing, as follows:—Meshing with each clutch-shaft pinion is a gear 84 fixed on the corresponding intermediate shaft, and to the gear 84 is secured a small pinion 85 which meshes with a large gear 86 keyed on the corresponding pinion shaft, so that the tread chains may be independently driven from the clutch shaft.

This driving connection is effected through the clutches 87 and 88 related, respectively, with the pinions. The mechanisms of the clutches are exactly alike, and the following description for the right-hand clutch 87 will also apply to the left-hand clutch 88, particular reference being made to Fig. 5. The side housing 61, likewise 62, is enlarged to enclose the clutch bell 83, and to the outer side of said housing is bolted the clutch housing 89, which has a removable cover plate 90 for access to the interior of the same from the side of the tractor, for ready adjustment or repair of the clutches.

The fly wheel 83 is the driven member of the clutch, and mounted within the same is the driving means, comprising the disc 91, which has a hub 92 splined on the shaft 65.

On the inner surface of the flange of the member 83 and on the surface of the hub 92 are provided a plurality of spaced splines 93 and 94, respectively, for engaging in the notches in the plurality of interposed clutch plates 95 and 96, the plates 95 being connected to the hub 92 and the plates 96 to the member 83; and rings 97 of friction material are inserted between the clutch plates.

For applying pressure to the series of plates, the follower disc 98 loosely encircles the hub 92, and on the outer surface of the disc is provided a projecting ring 99 which is engaged by the cams 100 of the bell crank levers 101. The levers 101 are pivotally mounted in a collar 102 which is threaded for adjustment on to the outer end of the hub 92, and the collar is secured in adjusted position on the hub by means of a set screw 103 which is threaded through the collar and engaged in the adjacent one of the plurality of longitudinal grooves 104 cut in the threaded end of the hub (see Fig. 5ª).

The outer end of the shaft 65 is provided with a rotatable bearing 105 mounted in the outer end of the housing 89, and the end of the shaft at the right side projects beyond the end of the housing, and keyed thereto is a power take-off pulley 106.

The fly wheel 83 has an inward thrust bearing against a finished surface 107 of the side housing, an anti-friction disc 108 is mounted between the disc 91 and the adjacent surface of the member 83, and between the outer end of the hub 92, of the disc 91, and the bearing 105, is inserted a spacer sleeve 109 which prevents movement of said clutch members along the shaft. By this arrangement thrust on the shaft from the clutch is avoided.

On the spacer is loosely mounted a rotatable sleeve 110 which is connected to the projecting ends of the levers 101 by the pairs of pivoted links 111. Thus by shifting the sleeve 110 along the shaft, pressure may be applied for compressing the series of plates and connecting the pinion 81 to the shaft 65. Rotatably mounted on the sleeve 110 is a ring 112 having oppositely disposed lugs 113 which are engaged by the forked arms 114 attached to the rock shaft 115, by which the clutch is controlled. The helical pressure spring 116 of the clutch is compressed between the non-rotating ring 112 and the end of the housing 89.

The rock shaft is rotatably mounted in the opposite walls of the housing 89, and to the end of the shaft projecting through the housing at the rear is pinned a control lever 117, for the clutch 87, and 118 for the clutch 88 at the opposite or left side.

Surrounding the clutch wheel 83 is a brake band 120 which is floatingly anchored to the pin 121 which is fixed in the adjacent walls of the housings; and for contracting the band, forked lugs 122 are secured to the ends of the band at the upper side.

Figure 3:
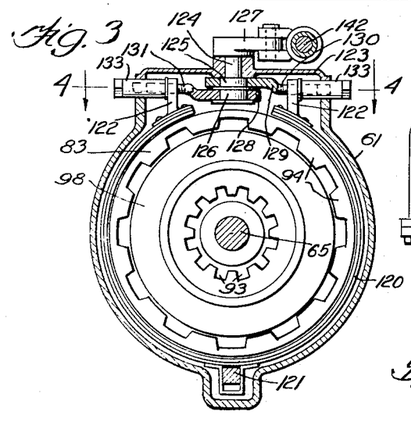
Fig. 3 is a section on line 3—3 of Fig. 2.
Figure 4:
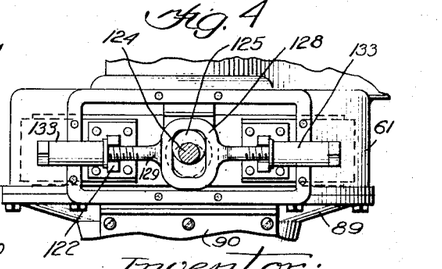
Fig. 4 is a plan view of the parts shown in Fig. 3, with the cover plate removed.

As best shown in Fig. 3 and Fig. 4, the upper portion of the side housing, above the clutch member 83, is provided with a removable cover 123, in which is rotatably mounted a vertically disposed cam shaft 124 having the oppositely projecting eccentric cams 125 and 126 formed on the inner end, and to the outer end is pinned a crank arm 127. Said cams are engaged, respectively, by yokes 128 and 129, the yoke 128 having a stem 130 projecting forwardly, and the yoke 129 having a stem 131 projecting rearwardly. The stems extend through the forks of the adjacent lug members 122 and are each threaded into a thimble 133 which is slidably and rotatably mounted between the cover 123 and the adjacent walls of the side housing. Thus by rotating the shaft 124 the thimbles may be moved inwardly to engage the lugs 122 and cause the ends of the bands to approach each other and contract the band into engagement with the periphery of the brake member 83, relative adjustment being effected by turning the thimbles on the stems.

The mechanism for controlling the clutches and brakes whereby power may be applied to either or both treads, and the brakes applied as the respective clutches are released, will now be described. On the top of the back portion of the casing 12 is bolted a control housing 135 having a removable cover 136. Near the front end of the housing, in the bottom wall 137 thereof and the cover 136, is journaled a vertically disposed steering post 138. Within the housing the post 138 projects through and is pinned to a collar 139 having the spaced flanges 140 and 141; and to the rear of the post is slidably mounted the transverse, horizontally disposed steering rod 142, supported in sleeves 143 and 144, at either end, which extend through the side walls and are slidably supported between said walls and the cover.

At the outer ends the sleeves extend through forks 146 provided in the ends of the upwardly projecting clutch levers 117 and 118. On the end of each sleeve is provided a flange 147 for engaging the fork as the sleeve is moved inwardly; and on each end the rod is provided with a flange plate 182 for engaging the ends of the sleeves. Adjacent the brake cam shafts 124 is fixedly mounted a fork member 148 on the sleeve 143, and 149 on the sleeve 144, in which, respectively, are engaged the pins 150 fixed in the ends of the levers 127; and on the inner ends of the sleeves, within the housing, are fixedly mounted the fork members 151 and 152 on the sleeves 143 and 144, respectively.

The steering rod 142 may be moved to the right or left by means of the steering wheel 154, the column 155 of which is attached to the steering post 138, the connection from the steering post to said rod being as follows: To the rear of the post and to the bottom wall 137 is pivotally mounted a horizontally disposed steering lever 156 having laterally projecting arms 157 and 158, the ends of which are connected to either side of the steering post by means of the respective links 159 and 160, the forward ends of said links being disposed between the flanges 140 and 141 and pinned thereto; and the end of the lever 156 is provided with an upwardly projecting pin 162 which engages with a slotted collar 163 fixed on the mid portion of the rod 142.

The length of the rod is such that when the steering lever 156 is in its central position both clutches 87 and 88 are released, and consequently engaged by pressure from their springs 116, the relative adjustment for accomplishing and equalizing this condition being made by means of the collars 102; and further adjustment may readily be made for obtaining equalized pressure on the clutches when the steering wheel is turned to the right or left. Also by the connection of each sleeve to the corresponding brake lever, the brake is applied as the clutch is released.

Figure 7:
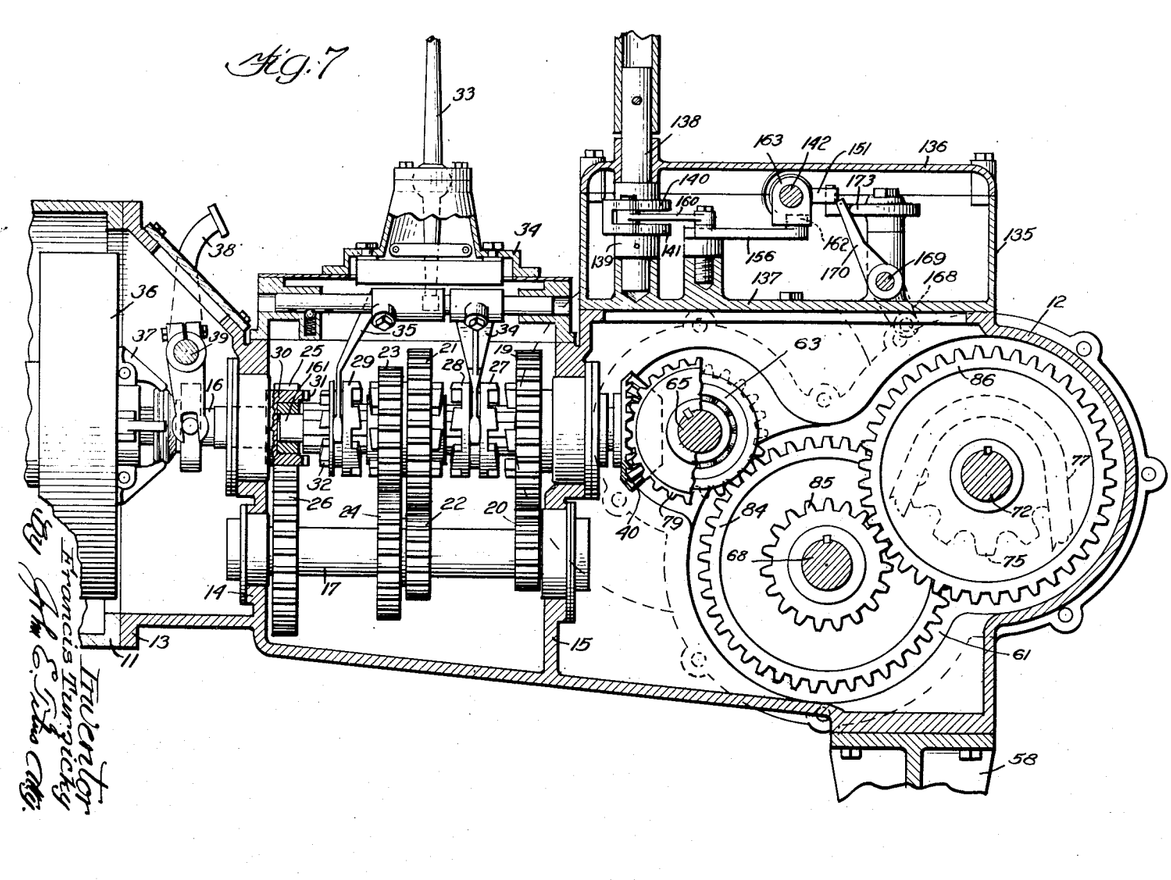
Fig. 7 is a longitudinal section through transmission, taken substantially on the line 7—7 of Fig. 2.
Figure 8:
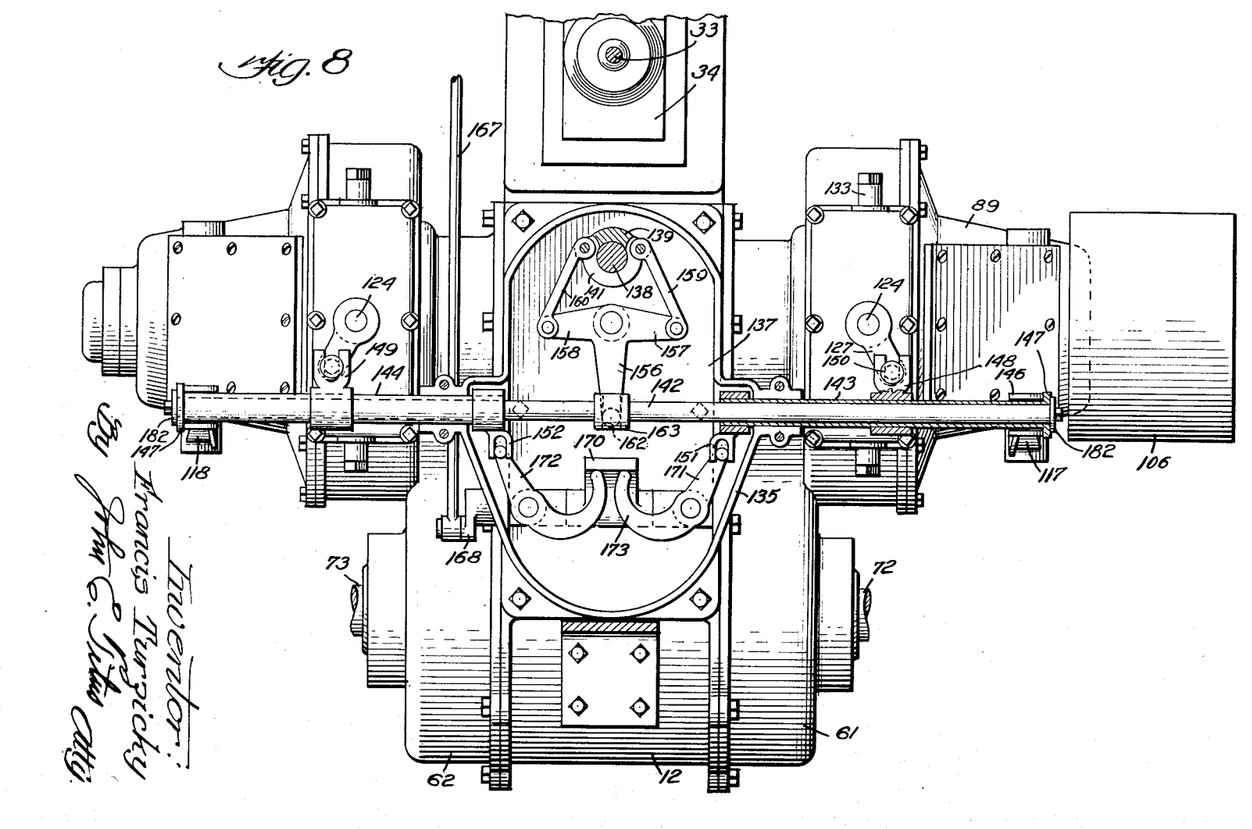
Fig. 8 is a plan sectional view of the rear portion of Fig. 1, with the cover removed, substantially on the line 8—8 of Fig. 1.

For simultaneously releasing both clutches and applying the brakes on both sides, also without changing the position of the steering wheel, a connection is made from the brake pedal 166. The pedal 166 is pivotally mounted on the side of the gear housing, and is connected by a rod 167 to a lever 168 which is pinned to a cam-lever rock shaft 169. The shaft 169 is horizontally disposed and extends transversely through the walls of the housing 135, the shaft being rotatably supported in said walls. Within the housing an upwardly projecting cam plate 170 is fixedly secured to the mid portion of the shaft, and directly over the shaft and at the sides of the housing are pivoted the horizontal levers 171 and 172. Said levers each have arcuate rear portions 173 which curve forwardly for engagement with the surface of the cam plate 170. At their ends, the levers 171 and 172 are provided with upwardly projecting pins 175 for engaging with the corresponding forks 151 or 152, which are fixed on the sleeves as described above. Therefore, when the brake pedal 106 is depressed, the cam plate 170 is rotated clockwise, as viewed in Fig. 7, and levers 171 and 172 are simultaneously rotated to draw the two sleeves inwardly. This engages the sleeve flanges 147 with the levers 117 and 118 to release both clutches, and rotates the cam shafts 124 to apply the brakes, there being an interval between the release of the clutch and the application of the brake. When power is taken off from the pulley 106 the brake pedal 166 is depressed and locked down by means of the toe-operated catch 176.

The catch 176 is pivotally mounted on the engine-housing frame member 178, and is normally raised by a spring 179. Thus the tractor may be instantly set in position and placed in condition for supplying power from the pulley.

It can now be seen that a construction is provided in which thoroughly standardized mechanisms may be used. The clutching on the high-speed shaft has many obvious advantages over the prior constructions, and by arranging the clutches at each side of the tractor the mechanism thereof is readily accessible. The tractor may be handled with great ease, and the individual brakes on the fly wheels enable quick turning and change in the direction of travel without undue straining of any of the mechanism.

The power take-off is always instantly available, the pulley is conveniently arranged at the side of the tractor with the axis at right angles thereto, as is desirable. Also, the power take-off merely requires the addition of the pulley to the requisite operating mechanism of the tractor.

In prior constructions, when the clutches were on slow-speed shafts, very massive mechanism of a special construction was required, while in this invention the clutches are comparatively light. Also, in prior constructions of tractors, the stationary track was under heavy strains. In the construction described, it is obvious that the stationary tread is merely released, and that the total available power may be concentrated on the moving tread.

While I have described but one illustrative embodiment of my invention, many alterations and omissions may be had without departing from the spirit of the invention, as defined in the following claims:

1. In a tractor having an engine and traction means at each side thereof, a variable speed transmission connectible to the engine, a transversely disposed power shaft geared at the middle to the transmission, a pinion rotatably mounted on said shaft at each side, speed reduction gearing connecting each pinion to the adjacent one of said means, a fly wheel at the outer side of each pinion and connected thereto, the fly wheel being open at the outer side, a flanged member disposed within the fly wheel and having a hub keyed to said shaft, a plurality of clutch plates having plates engaged with the fly wheel interposed with plates engaged with said hub, a ring adjustably secured to the hub, levers pivotally mounted on said ring for compressing the plates, and clutch operating means for positioning the levers, and a steering wheel, said clutch operating means at each side being alternately controlled by the steering wheel.

2. In a tractor having an engine and independent traction means at each side, a power shaft transversely disposed in the tractor and having a bevel pinion at the middle for connecting the shaft to the engine, a pinion geared to the adjacent traction means rotatably mounted on the shaft at either side of said bevel pinion, a clutch wheel connected to the outer side of each pinion, a normally engaged clutch mounted on each end of the shaft for connecting the adjacent wheel to the shaft, a brake related with each wheel, a control lever for releasing each clutch and a control lever for applying each brake, a slidably mounted sleeve at each side connected to the adjacent clutch and brake lever, a rod slidably mounted in the sleeves and having a sleeve engaging flange at each end, a steering wheel connected to the rod for moving the sleeves to release the clutch and apply the brake at each side in alternation.

3. In a tractor having an engine and independent tractor means at each side, a transverse power shaft connectible at the middle to the engine, a clutch mounted on the shaft at each side for connecting the shaft to the adjacent traction means, each clutch being connected to the corresponding traction means through a reduction gearing, a brake for said means related with each clutch, a lever for releasing each clutch and a lever for applying each brake, a movable member connected to the clutch lever and the corresponding brake lever at each side so that when the member is moved the corresponding clutch is released and then the brake is applied, a steering wheel for moving said members in alternation, and a brake pedal for moving both members to simultaneously release both clutches and apply both brakes.

4. In a tractor having an engine and independent traction means at each side, a longitudinally disposed variable speed transmission connectible to the engine, a transverse power shaft connected to the transmission, a reduction gear train at each side for driving the adjacent traction means, a normally engaged clutch mounted on the shaft at either side for connecting the adjacent gear train to the shaft, a brake related with each clutch, a slidable transversely disposed sleeve mounted at each side, each sleeve being connected to release the corresponding clutch and thereafter apply the brake, a rod slidably mounted in the sleeves and having a sleeve engaging flange at each end, a steering wheel for moving the rod in either direction, a pivotally mounted lever engaged with each sleeve, and a brake pedal connected for operating both of said levers simultaneously.

5. In a tractor having an engine and independent traction means at each side, a longitudinally disposed variable speed transmission connectible to the engine, a transverse power shaft connected to the transmission, a reduction gear train at each side for driving the adjacent traction means, a normally engaged clutch mounted on the shaft at either side for connecting the adjacent gear train to the shaft, a brake related with each clutch, a slidable transversely disposed sleeve mounted at each side, each sleeve being connected to release the corresponding clutch and thereafter apply the brake, a rod slidably mounted in the sleeves and having a sleeve engaging flange at each end, a steering wheel for moving the rod in either direction, a pivotally mounted lever engaged with each sleeve, a rotatably mounted shaft having a cam plate for engaging both levers, and a brake pedal for rocking the shaft.

Signed at Chicago, Illinois, this 23rd day of December, 1930.

FRANCIS TURZICKY.